United States Patent [19]

Hall

[11] Patent Number: 4,554,305

[45] Date of Patent: Nov. 19, 1985

[54] HYDROGEN PEROXIDE-FREE AND HYDROFLUORIC ACID-FREE AUTODEPOSITION BATHS

[75] Inventor: Wilbur S. Hall, Springvale, Me.

[73] Assignee: Amchem Products, Inc., Ambler, Pa.

[21] Appl. No.: 717,047

[22] Filed: Mar. 28, 1985

[51] Int. Cl.$^4$ .................................................. C08K 3/16
[52] U.S. Cl. .................................... 524/321; 148/6.2;
427/435; 524/300; 524/401; 524/428; 524/438
[58] Field of Search ........................ 148/6.2; 427/435;
524/301, 321, 438, 401, 428

[56] References Cited

U.S. PATENT DOCUMENTS

| | | | |
|---|---|---|---|
| 3,585,084 | 6/1971 | Steinbrecher et al. | 148/6.2 |
| 3,592,699 | 7/1971 | Steinbrecher et al. | 148/6.2 |
| 3,709,743 | 1/1973 | Dalton et al. | 148/6.2 |
| 4,186,219 | 1/1980 | Hall | 427/8 |
| 4,215,162 | 7/1980 | Kunnen | 524/300 |
| 4,313,983 | 2/1982 | Chaker | 524/321 |
| 4,373,050 | 2/1983 | Steinbrecher et al. | 524/405 |
| 4,414,350 | 11/1983 | Hall | 524/320 |

*Primary Examiner*—Paul R. Michl
*Attorney, Agent, or Firm*—Ernest G. Szoke; Henry E. Millson, Jr.; Mark A. Greenfield

[57] ABSTRACT

Autodeposition unsaturated latex baths which are hydrogen peroxide-free (using iodine or certain iodine salts or free acids as the oxidizer) and which are hydrofluoric acid-free (using, preferably, acetic acid) afford coatings which can incorporate silicate-containing pigments, fillers, and other ingredients.

24 Claims, No Drawings

HYDROGEN PEROXIDE-FREE AND HYDROFLUORIC ACID-FREE AUTODEPOSITION BATHS

BACKGROUND OF THE INVENTION

1. Field of the Invention

This invention relates to hydrogen peroxide-free and hydrofluoric acid-free coating compositions used in the autodeposition of resinous coatings on iron, zinc, and their alloys.

2. Statement of the Related Art

Compositions and processes for the autodeposition coating of organic polymers on metals are now well known, having been disclosed in related U.S. Pat. Nos. 3,585,084 and 3,592,699 to Steinbrecher and Hall, both assigned to Amchem Products, Inc., Ambler, Penn., U.S.A., as well as in later U.S. Pat. No. 3,709,743, among others.

These patents, as well as U.S. Pat. No. 4,373,050, to Steinbrecher and Hall, also assigned to Amchem Products, Inc., all disclose the need for an acid, preferably hydrofluoric, and an activating compound, which is generally an oxygen-containing oxidizing agent. For the purpose of this invention, "oxidizing agent" or "oxidizer" is defined as a substance which has, or promotes in aqueous solution, a positive reduction potential greater than that of hydrogen, and which need not itself contain oxygen.

U.S. Pat. No. 3,585,084 discloses using hydrofluoric acid and, as utilizable oxidizing agents, hydrogen peroxide, dichromate, perborate, bromate, chlorate, permanganate, nitrite, and nitrate, in the form of alkali and ammonium salts; hydrogen peroxide and dichromates being preferred and used as the oxidizing agent in every example except Example 87, which discloses using nitric acid as both an oxidizing agent and a source of acid for the bath composition.

U.S. Pat. No. 3,592,699 discloses using hydrofluoric acid and only the use of hydrogen peroxide or dichromate ions as the oxidizing agent.

U.S. Pat. No. 3,709,743 discloses using hydrofluoric acid, and an oxidizing acid as the oxidizing agent, but only nitric acid is specifically disclosed, and is used in all the examples.

U.S. Pat. No. 4,373,050 discloses the desirability of using an oxidizing agent even in addition to an acid such as nitric acid, (which itself can function as an oxidizing agent), because of gassing problems. The same oxidizing agents as in U.S. Pat. No. 3,585,084 are disclosed, with hydrogen peroxide and dichromate salts again being preferred, the examples being essentially identical to those of U.S. Pat. No. 3,585,084.

U.S. Pat. No. 4,414,350 discloses autodeposition compositions containing hydrofluoric acid with a ferric salt such as ferric fluoride, which generates increasing amounts of ferrous ions. The concentration of ferrous ions is then controlled by adding at least one carboxylic acid, which forms a ferrous ion complex. Useful carboxylic acids include acetic, itaconic, succinic, acrylic and citric, with citric acid being preferred.

South African patent application No. 72/1146 discloses autodeposition compositions using hydrofluoric or acetic acids, and a persulfate oxidizing agent, among others mentioned above.

U.K. Pat. No. 1,241,991 discloses autodeposition compositions using p-benzoquinone and p-nitrophenol, among others mentioned above.

In the known autodeposition compositions and processes partially exemplified by the foregoing related art, gassing will occasionally occur when the oxidizing agent, particularly hydrogen peroxide which is most commonly used, reacts with iron compounds that are present. This gassing is probably the cause of discontinuities in the autodeposited coating, which in turn lead to decreased corrosion protection. Furthermore, certain latices, specifically those with polymers having C=C bonds, appear to be somewhat permeable to corrosion, possibly because of these double bonds.

Hydrogen peroxide is the most frequently mentioned oxidizer in prior art autodeposition compositions and is widely used in industry. However, hydrogen peroxide has a number of serious disadvantages, of which the following is one example.

U.S. Pat. No. 4,186,219 discloses the use of hydrogen peroxide in autodeposition compositions comprising latex, hydrofluoric acid and ferric fluoride ($FeF_3$), in aqueous solution. In such a system, the ferric fluoride acts as the oxidizer for the iron-containing substrate metal. As the substrate is processed, the ferric fluoride is reduced to ferrous fluoride ($FeF_2$), and substrate iron is oxidized to ferrous fluoride which results in a decrease in oxidizing potential and, if allowed to increase in concentration, will also result in destabilization of the entire coating composition. Hydrogen peroxide is added, not to oxidize the substrate, but rather to oxidize the ferrous state back to a ferric state, thus restoring the original oxidizing potential of the bath.

However, if the hydrogen peroxide is added in excess of the amount required to restore the oxidizing potential of the autodeposition bath, it will cause undue and inefficient dissolution of the iron-containing substrate, and an increase in the total amount of ferric fluoride in the coating composition. As the concentration of ferric fluoride further increases, so does the dissolution rate of the iron-containing substrate, and the autodeposition process becomes difficult to control.

Moreover, hydrogen peroxide is a very powerful oxidizer which, when added to the autodeposition coating composition to restore its original redox potential, can attack the stabilizer contained within the latex polymer dispersion and result in still further problems, such as soft coatings which show decreased resistance to water rinsing after removal of the substrate from its immersion in the autodeposition coating bath.

SUMMARY OF THE INVENTION

Hydrofluoric acid, although frequently employed in commercial autodeposition processes, has certain well-known disadvantages. According to The Merck Index, ninth ed., Merck & Co., Inc., Rahway, N.J., U.S.A. (1976) it is a colorless or almost colorless fuming liquid, that is poisonous, causes severe skin irritation upon contact, and must be handled with extreme caution. Fortunately, proper handling reduces these risks to a minimum, although it would be preferable to avoid them entirely. Furthermore, hydrofluoric acid is a known solvent for silica. As a result, it is impossible to employ certain pigments and fillers in a hydrofluoric acid-containing autodeposition bath, that would otherwise be desirable. Such pigments and fillers include clays, talcs, silicate flatting agents, silicate pigments, and the like.

The present invention provides autodeposition baths oxidizing agents which avoid the problems of handling and using dangerous acids such as hydrofluoric, (which also prevents using silicate-containing ingredients), and gassing, while providing an autodeposition coating with increased corrosion resistance when the latices used contain polymers with carbon to carbon double bonds. The autodeposition coatings of this invention can be deposited on iron, zinc, and their alloys (especially steel) but not on aluminum, copper, or their predominant alloys.

The oxidizing agents of this invention are: elemental iodine in the form of a water soluble complex, and water soluble iodate and periodate salts or free acids. The periodate salts may contain either the $IO_4^-$ or the $IO_6-5$ ion. The hypoiodate ($IO^{31}$) ion is not suitable for use in this invention because its oxidation number ($+1$) is too low. Bromine and bromates were tested and found to be useable in this invention, although not as good as the corresponding iodine and iodates. However, the handling of bromines presented such difficulties that they are not considered to be within the scope of this invention. Fluorine forms no ternary compounds and is not within the scope of this invention. Chlorine and chlorate were found to be poorly operative for the purposes of this invention, and are therefore not included herein.

The foregoing oxidizing agents are utilized to activate autodeposition coating baths whose other ingredients are given below in more detail.

When employing the above oxidizing agents, hydrofluoric acid may be completely eliminated from the autodeposition bath, and replaced by acids such as glacial acetic acid ($CH_3COOH$) which is not only easier to handle than hydrofluoric acid, but also is compatible with the certain pigments and fillers abovementioned. Acetic acid is incompatible with carbonates, hydroxides, many oxides, phosphates, etc., (see Merck Index, supra) but can be used with most other ingredients.

Other than in the operating examples, or where otherwise indicated, all numbers expressing quantities of ingredients or reaction conditions used herein are to be understood or modified in all instances by the term "about".

DETAILED DESCRIPTION OF THE INVENTION

Autodeposition coating chemical baths are acidic aqueous dispersions containing at least one latex, acid, activating (oxidizing) agent, water, and optionally, pigment, surfactant, and other auxiliaries.

The preferred latices useful herein must, as a critical property, comprise at least one unsaturated polymer, which may either retain a recurring unsaturated backbone, have a recurring unsaturated branch chain, or both. Another critical property is, of course, that the polymers are suitable for the preparation of latices which themselves are suitable for autodeposition coatings. Thus, the latices must comprise polymers, or copolymers, in which at least one of the constituent polymers has a recurring polyunsaturated unit. Such unsaturated polymers are obtainable from $C_{4-9}$ alkadiene monomers such as butadienes, pentadienes and hexadienes, as well as substituted $C_{4-9}$ alkadienes such as isoprene (2-methyl-1,3-butadiene), chloroprene (2-chloro-1,3-butadiene), and 2,3-dimethyl-1,3-butadiene. Of these monomers, the butadienes and isoprene are preferred, the butadienes being most preferred.

Copolymers are generally preferred over homopolymers, provided always that at least one of the polymers is unsaturated. Examples of useful copolymers include, but are not limited to:
styrene/butadiene;
styrene/butadiene/acrylonitrile;
styrene/butadiene/acrylic acid;
styrene/butadiene/methacrylic acid;
styrene/butadiene/butylacrylate;
styrene/butadiene/butylacrylate/acrylic acid;
styrene/butadiene/butylacrylate/methacrylic acid;
butadiene/acrylonitrile/methacrylic acid;
styrene/pentadiene;
styrene/hexadiene;
styrene/isoprene;
styrene/chloroprene;
styrene dimethyl-butadiene;
and the like. Styrene/butadiene copolymers are preferred.

Latices comprising the above polymers and copolymers are generally commercially available, and have been disclosed in numerous patents, including U.S. Pat. No. 3,472,808. The polymer resin particles suspended in the latices are preferably of uniform size and composition, and may contain agents to assist in the suspension. The exact composition of a latex is not important, provided that the polymer/copolymer comprised therein is as described above. The amount of the polymer resin comprised within the latex and within the completed coating composition may vary within a wide range. The minimum polymer concentration within the coating composition is that which is effective to autodeposit a resinous coating on the object being treated. The maximum polymer concentration within the coating composition is determined by the amount of the resinous particles that physically can be dispersed in the coating composition. A range of 5 to 550, preferably 75 to 250 g/l of resin solids is usually adequate, although these ranges may vary depending upon the nature of the resin and the remaining ingredients in the coating composition.

The pH of the acidic coating composition should be less than 5 preferably 1.6 to 3.8. The Acids that are useful in this invention are at least one of: acetic, acrylic, adipic, chloroacetic, citric, dichloroacetic, diglycolic, fumaric, gallic, itaconic, lactic, malic, malonic, succinic, and tartaric. Preferred acids are acetic, citric, fumaric, diglycolic, and maleic. Acetic acid is most preferred. The amount of acid used is that which is sufficient to achieve the above pH ranges, taking into account the pH of all other ingredients and the acid's dissociation constant. When acetic acid is used, a range of 15.0 to 25.0 g/l is satisfactory; 20 g/l being preferred.

The activating (oxidizing) agent for the autodeposition bath compositions of this invention may be at least one of elemental iodine in the form of a water soluble complex with at least one water soluble iodine salt such as LiI, NaI, KI, RbI, and NH$_4$I. Of these salts, potassium and sodium are preferred, the complexes formed being KI I$_2$ and NaI I$_2$. The complex may be prepared very simply by first adding the elemental iodine and then adding the iodine salt, titrating the salt addition to the point at which the solid elemental iodine dissolves. The complex can thus be formed in situ in the bath, or as an aqueous solution to be added to the bath. Also useful are ternary compounds in which the iodine is combined with oxygen to form an iodate or periodate ion. Any such compounds are useful, provided that they are water soluble. Specific compounds are: iodate salts or free acids such as $KIO_3$, $NaIO_3$, $NH_4IO_3$, or $HIO_3$; and periodate salts or free acids such as $KIO_4$, $NaIO_4$ or $HIO_4$. Of the foregoing, $HIO_3$, $HIO_4$, are preferred. The various iodine compounds and complexes may be used individually or in any combination thereof.

Under autodeposition conditions, the iodates and periodates act as oxidants and appear to be reduced to elemental iodine and an iodide. The iodide then complexes with and solubilizes the elemental iodine. Thus, the iodates and periodates not only achieve the same effect as the use of an elemental iodine and iodide complex, namely, to introduce iodine into the autodeposition bath in a solubilized state, but also are stronger oxidizers, as evidenced by their respective oxidation potentials. In fact, iodates and periodates deposit coating more rapidly than does elemental iodine. Thus, when elemental iodine is the only oxidizer used, the first amounts added to the bath add directly across the double bonds. Extra iodine is then needed to provide the oxidation of the substrate metal in order to cause autodepostion.

When an elemental iodine/iodide salt complex is used, the coating bath should containe 4.4 to 5.6 g/l, as measured by the elemental iodine. When an iodate or periodate is used, the coating bath should contain 1.4 to 2.5 g/l, measured by the iodine-containing ion.

The activating (oxidizing) agents of this invention are superior to conventional oxidizing agents because they exhibit none of their disadvantages, namely, gassing (commonly caused by hydrogen peroxide), chemical attacks on the resin, excess dissolution of the metal substrate when an excess of oxidizer is present, and the formation of the ferryl ion. The ferryl ion ($FeO^{++}$) is an unstable compound of tetravalent iron formed as an intermediate, and was first disclosed by Bray and Gorin in a communication to the editor of *J. Am. Chem. Soc.* 54:2124–5(1932); Chem. Abs. 26:3450.

An even more important benefit of this invention, independent of the foregoing, is that autodeposited coatings according to this invention show an improvement in corrosion resistance of 300 to 400% over prior art compositions using the same latex polymers, but with conventional oxidizing agents rather than those of this invention.

The following is a theoretical explanation of this improved corrosion resistance, not intended to be limiting. Latices useful in this invention are described above as those which comprise at least one polymer with carbon to carbon double bonds in its recurring backbone or in a recurring branch chain of the backbone. Such latices are widely used for autodeposition coatings because of their generally superior coatability, appearance, and substrate protection. However, such polymers may not afford superior protection against corrosion, apparently because of their permeability to corrosive agents. It can theoretically be predicted from the Pauling Electronegativity Chart, that $I_2$ in the bath solution will add to the polymers at the least-substituted carbon atoms. Furthermore, it is pragmatically known that $I_2$ adds rapidly across unsaturated bonds from ASTM D1959, Standard Test Method for Iodine Value of Drying Oils and Fatty Acids. It has been observed in the laboratory that the iodine atom does not accumulate in the coating bath, but is instead bound by the coating resin. From this, one can theoretically conclude that the iodine atom breaks the carbon to carbon double bonds in the polymer and an iodine ion bonds to each carbon atom, which results in a decrease in the permeability of the resin coating to corrosive agents and the unexpectedly large improvement in the coating corrosion resistance.

The pigment or other colorant optionally included in the autodeposition coating composition may be any known to be compatible with the prior art compositions, such as carbon black dispersions which are commercially available. It is a particular advantage of this invention that silicate-containing pigments and colorants may also be used, affording finished coating colors and appearances that could not be achieved in prior art compositions which contain hydrofluoric acid.

The process steps and conditions for autodeposition, namely, cleaning the substrate, immersion in the coating bath, rinsing, optional reaction rinsing, curing of the coating resin, etc., are the same as those disclosed in the prior art for similar compositions which differ as to the activator (oxidizer) and acid.

The following examples are illustrative of various embodiments of this invention.

Hydrogen Peroxide-free and Hydrofluoric acid-free Examples (1–3 and 4)

Example 1

An autodeposition bath was prepared in which glacial acetic acid was used instead of hydrofluoric acid and iodic acid was used as the activator (oxidizer) rather than hydrogen peroxide. The bath had the following composition

| Ingredients | Amounts, g/l |
| --- | --- |
| Styrene/butadiene latex, 55% solids | 180.0 |
| Glacial acetic acid | 20.0 |
| Iodic acid | 1.5 |
| Deionized water to 1.0 liter | q.s. |

The cold rolled, mild steel panels were immersed in the above composition at room temperture for 90 seconds. They were removed from the bath and allowed to stand in air for 60 seconds, followed by tapwater rinsing, and then baking for 10 minutes at 176° C.

The coating surface was brown, uniform, of fairly high gloss, and 1.3 mils (33μ) thick. A series of pale concentric lines showed up strongly on the highly glossy surface. The coating easily withstood 160 inch-pounds impact/tape.

EXAMPLE 2

Example 1 was repeated using the same autodeposition bath and experimental parameters, except that after the tapwater rinse, but before baking, the panels were subjected to a 30 second sodium chromate solution reaction rinse.

The coating surface was brown, uniform, glossy and very attractive, having the appearance of polished brown leather.

EXAMPLE 3

The panels of Example 2 were subjected to the Salt Spray Test (ASTM D117) to determine their corrosion resistance with the following results

| Hours in Salt Spray | Scribe failure | ASTM Rating* |
| --- | --- | --- |
| 168 | 1/64" (0.4 mm) | 9.0 |
| 336 | ⅛" (3.2 mm) | 6.0 |
| 504 | severe | 0 |

| Hours in Salt Spray | Scribe failure | ASTM Rating* |
|---|---|---|
| | corrosion | |

*A "10" rating means no failure whatever, a "0" rating means total failure.

Hydrogen Peroxide-free Examples (A–C)

The following examples demonstrate that elemental iodine, iodate salts, and periodate salts and free acid may be substituted for the Iodic acid of Examples 1 and 2. Hydrofluoric acid was used in these examples rather than an organic acid such as glacial acetic acid, and the examples are therefore not within the scope of this invention with regard to the primary acid.

EXAMPLE A

This example demonstrates the use of potassium iodate as the sole oxidizer in an autodeposition composition and shows the unusual corrosion resistance achieved. The following autodeposition bath was prepared:

| Ingredients | Amounts, g/l |
|---|---|
| Styrene/butadiene latex, 55% solids | 180.0 |
| Hydrofluoric acid | 2.1 |
| Potassium iodate | 2.0 |
| Deionized water to 1.0 liter | q.s. |

Cold rolled, mild steel panels were immersed in the above composition at room temperature for 90 seconds. They were removed from the bath and allowed to stand in air for two minutes followed by tapwater rinsing for 30 seconds followed by 30 seconds immersion in a solution of 9.0 g of sodium dichromate dihydrate per liter. After baking for 10 minutes at 160° C., the coatings were found to be very uniform with near specular gloss, and they were 1.3 mils thick (33μ). The coatings easily withstood 160 inch-lbs reverse impact. Even when cellophane adhesive tape was applied evenly over the impacted area and vigorously torn from the surface, there was no loss of adhesion. Adhesion and appearance, therefore, are excellent. The following table illustrates the high order of corrosion resistance when tested in salt spray after scribling (ASTM D117).

| Hours in Salt Spray | ASTM Rating* |
|---|---|
| 168 | 10 |
| 336 | 7 |
| 672 | 7 |
| 816 | 7 |

*A "10" rating means no failure whatever, a "0" rating means total failure.

EXAMPLE B

This example shows that a complex of elemental iodine with a valence of zero and an iodine salt (KI) has sufficient oxidizing power to effect autodeposition. Using the latex of Example A, the following bath was prepared:

| Ingredients | Amounts, g/l |
|---|---|
| Styrene/butadiene latex, 55% solids | 180 |
| Hydrofluoric acid | 2.1 |
| Iodine (dissolved in KI solution)* | 5.0 (iodine) |
| Deionized water to make 1.0 liter | q.s. |

*added later

In 90 seconds immersion, without the iodine, rolled steel panels showed only a thin, adsorbed layer of coating measuring 0.1 mil (2.5μ). This is due to the absence of oxidizer. Iodine crystals were then dissolved in barely sufficient KI solution to effect solution, added to the coating compostion, and panels were again immersed in the coating compostion for 90 seconds. This caused the autodeposition of a uniform, brown, fairly glossy, lightly textured coating, 0.8 mil thick (20μ). When immersed for 5 minutes, coatings were slightly glossy, lighter in color, and 1.3 mils (33μ) thick.

EXAMPLE C

The following example illustrates the use of sodium periodate as the sole oxidizer in an autodeposition bath.

| Ingredients | Amounts, g/l |
|---|---|
| Styrene/butadiene latex, 55% solids | 180 |
| Hydrofluoric acid | 2.1 |
| NaIO$_4$ | 1.5 |
| Deionized water to make 1.0 liter | q.s |

Cold rolled, mild steel panels were immersed in the above composition for 90 seconds, held in air two minutes, rinsed in tapwater, immersed 30 seconds in 9.0 g/l of Na$_2$Cr$_2$O$_7$.2H$_2$O, and baked 10 minutes at 176° C. The panels had a uniform, glossy, dark tan coating, 1.0 mil (25μ) thick. After 168 hours in salt spray test (ASTM D117), the coatings were excellent and the panels rated 10. After 336 hours, the coating rating was 8.5, based upon less than 1/32-inch (0.8 mm) failure at the scribe.

Examples A–C show that even in the absence of any other oxidizer, (such as ferric fluoride), iodine, iodate and periodate will all effect autodeposition.

EXAMPLE 4

This example demonstrates the uptake of elemental iodine by a latex polymer comprising carboxylated styrene/butadiene having double bonds in the polymer chain. In a separate experiment conducted simultaneously, an all acrylic latex polymer at the same solids content (acrylonitrile/butyl acrylate/methacrylic acid) showed that such a completely saturated polymer does not take up elemental iodine from solution.

One beaker contained 200 mls of carboxylated styrene/butadiene copolymer with 18 g of solids. The second beaker contained 200 mls of the all acrylic copolymer with 18 g of solids. Starch indicator solution was added to both beakers.

A complex solution of iodine in potassium iodide was prepared. One dropperful of the iodine complex was added to the acrylic dispersion and a positive reaction to free iodine was shown by the starch indicator. After addition of 30 dropperfuls of the iodine solution to the carboxylated styrene/butadiene dispersion, there was still no indication of free iodine by the starch indicator.

CONCLUSIONS

Based upon the foregoing examples and upon other laboratory experimentation not described in detail herein, certain conclusions may properly be reached.

The use of hydrofluoric acid can be avoided when the disclosed iodine compounds are used as the oxidizer. Various other acids can be used instead, of which acetic is preferred. The use of acids other than hydrofluoric permits using a wide variety of optional ingredients.

The use of iodate and periodate oxidizers with latices containing carbon to carbon double bonds in recurring units, produces a substantial increase in the corrosion resistance of autodeposition coatings formed from these latices. The improvement appears to be related to the addition of elemental iodine across the double bonds and possibly as well as by the formation of a light conversion coating between the substrate and the resin (laboratory example omitted).

Elemental iodine can be added directly to the latex to produce the improved corrosion resistance of this invention. However, unless there is a large excess of the elemental iodine over the amount needed to add to the double bonds, an auxiliary oxidizing agent such as ferric fluoride is desirable in the bath, in which instance the iodine oxidizers of this invention will act to control the redox potential, rather than hydrogen peroxide with its undesirable side effects. Iodic acid alone produces enough iodine during autodeposition to give good corrosion resistance. Autodeposition baths incorporating the iodine and iodine compound oxidizing agents disclosed herein have shown good stability and easy control and give constancy of film build-up and appearance. The film coating deposition rate is easily controlled by varying the redox potential and the bath solids.

Unlike oxidizing agents such as hydrogen peroxide, the iodine oxidizing agents of this invention do not cause formation of the undesirable ferryl ion and appear to have no ill effect on the stabilizer system. There is no gassing when the iodine oxidizing agents of this invention are added to ferric or ferrous ions in the autodeposition bath. This itself may be a contributory factor in the improved corrosion resistance achieved using the inventive oxidizing agents.

Since the iodine oxidizing agents (including iodic acid) do not produce ferryl ions, they can be used in amounts in excess of those necessary to restore the ferric/ferrous redox potential when autodeposition coating an iron-containing substrate. When an excess of the known oxidizing agent hydrogen peroxide is used, the bath destabilizes rapidly, even without processing the metal substrate.

Polymer latices which do not contain carbon to carbon double bonds, do not absorb iodine. However, it is conceivable that such latices would show the advantages of this invention, other than the increase in corrosion inhibition. Such advantages would be, the ability to operate the autodeposition baths at higher redoxes without bath deterioration, the formation of conversion coatings beneath the polymer layer, and the lack of gassing in the system. To accomplish this, it is necessary that such saturated latices be used in combination with sufficient unsaturated latices to absorb any free iodine remaining in the bath, across the double bonds of such unsaturated latices.

I claim:

1. An aqueous acidic autodeposition composition for depositing a resinous coating on an iron- and/or zinc-containing metal substrate, comprising a resinous latex, an acid, and an oxidizer, all present in amounts effective to deposit said coating, wherein: said latex polymer is a copolymer; said acid is at least one of acetic, acrylic, adipic, chloroacetic, citric, dichloroacetic, diglycolic, fumaric, gallic, itaconic, lactic, malic, malonic, succinic, or tartaric and said oxidizer is elemental iodine complexed with a water soluble iodide, an iodate salt or free acid, a periodate salt or free acid, or any mixture of the foregoing.

2. The composition of claim 1 wherein said latex comprises at least one polymer whose recurring backbone unit and/or whose recurring branch chain has at least one carbon to carbon double bond.

3. The composition of claim 1 wherein said latex comprises at least one butadiene or isoprene polymer.

4. The composition of claim 1 wherein said latex comprises at least a butadiene/styrene copolymer.

5. The composition of claim 1 wherein: said water soluble iodide is at least one of LiI, NaI, KI, RbI or $NH_4I$; said iodate is at least one of $KIO_3$, $NaIO_3$, $NH_4IO_3$, or $HIO_3$; and said periodate is at least one of $KIO_4$, $NaIO_4$, or $HIO_4$.

6. The composition of claim 2 wherein: said water soluble iodide is at least one of LiI, NaI, KI, RbI, or $NH_4I$; said iodate is at least one of $KIO_3$, $NaIO_3$, $NH_4IO_3$, or $HIO_3$; and said periodate is at least one of $NaIO_4$, or $HIO_4$.

7. The composition of claim 2 wherein said oxidizer is: iodine complexed with sodium iodide or potassium iodide; sodium or potassium iodate; iodic acid; sodium or potassium periodate; periodic acid; or any mixture of the foregoing.

8. The composition of claim 3 wherein said oxidizer is: iodine complexed with sodium iodide or potassium iodide; sodium or potassium iodate; iodic acid; sodium or potassium periodate; periodic acid; or any mixture of the foregoing.

9. The composition of claim 4 wherein said oxidizer is: iodine complexed with sodium iodide or potassium iodide; sodium or potassium iodate; iodic acid; sodium or potassium periodate; periodic acid; or any mixture of the foregoing.

10. The composition of claim 2 wherein said oxidizer is iodic acid or periodic acid.

11. The composition of claim 1 wherein said oxidizer is elemental iodine complexed with a water soluble iodide salt, and is present in an amount of about 4.4 to 5.6 g/l of autodeposition composition, as measured by the elemental iodine.

12. The composition of claim 1 wherein said oxidizer is either an iodate or a periodate, and is present in an amount of about 1.4 to 2.5 g/l of autodeposition composition, as measured by the iodine-containing ions.

13. The composition of claim 2 wherein said oxidizer is either an iodate or a periodate, and is present in an amount of about 1.4 to 2.5 g/l of autodeposition composition, as measured by the iodine-containing ions.

14. The composition of claim 8 wherein said oxidizer is either an iodate or a periodate, and is present in an amount of about 1.4 to 2.5 g/l of autodeposition composition, as measured by the iodine-containing ions.

15. The composition of claim 1 wherein said acid is present in an amount sufficient to make the pH of said composition more acidic than 5.

16. The composition of claim 1 wherein said acid is present in an amount sufficient to make the pH of said composition between about 1.6 and 3.8.

17. The composition of claim 1 wherein said acid is acetic, citric, fumaric, diglycolic, maleic, or any mixture thereof.

18. The composition of claim 2 wherein said acid is acetic, citric, fumaric, diglycolic, maleic, or any mixture thereof.

19. The composition of claim 3 wherein said acid is acetic, citric, fumaric, diglycolic, maleic, or any mixture thereof.

20. The composition of claim 4 wherein said acid is acetic, citric, fumaric, diglycolic, maleic, or any mixture thereof.

21. The composition of claim 1 wherein said acid is acetic acid present in an amount of about 15 to 25 g/l.

22. The composition of claim 7 wherein said acid is acetic acid and is present in an amount of about 15 to 25 g/l.

23. The composition of claim 10 wherein said acid is acetic acid and is present in an amount of about 15 to 25 g/l.

24. The composition of claim 13 wherein said acid is acetic acid and is present in an amount of about 15 to 25 g/l.

* * * * *